United States Patent [19]

Anderson

[11] 4,029,998

[45] June 14, 1977

[54] CAPACITOR DISCHARGE IGNITION CIRCUIT

[75] Inventor: Harold Elden Anderson, Los Angeles, Calif.

[73] Assignee: McCulloch Corporation, Los Angeles, Calif.

[22] Filed: Mar. 3, 1975

[21] Appl. No.: 554,496

[52] U.S. Cl. .................... 361/256; 123/117 R
[51] Int. Cl.² ............................... F02P 1/02
[58] Field of Search ... 317/96; 123/117 R, 148 CC, 123/102

[56] References Cited

UNITED STATES PATENTS

| 3,367,314 | 2/1968 | Hirosawa et al. | 123/148 CC |
| 3,500,809 | 3/1970 | Hohne et al. | 123/148 CC |
| 3,704,700 | 12/1972 | Wesemeyer | 123/148 CC |
| 3,704,701 | 12/1972 | Struber et al. | 123/148 CC |
| 3,720,194 | 3/1973 | Mallory, Jr. | 123/148 CC |
| 3,729,647 | 4/1973 | Mainprize | 123/148 CC |
| 3,835,830 | 9/1974 | Shepherd | 123/148 CC |
| 3,838,671 | 10/1974 | Farr | 123/148 CC |
| 3,851,636 | 12/1974 | Just et al. | 123/148 CC |
| 3,865,092 | 2/1975 | Schmaldienst | 123/148 CC |
| 3,866,589 | 2/1975 | Haubner et al. | 123/148 CC |

Primary Examiner—J. V. Truhe
Assistant Examiner—Clifford C. Shaw
Attorney, Agent, or Firm—Burns, Doane, Swecker & Mathis

[57] ABSTRACT

A capacitor discharge ignition system utilizing in-phase charging and trigger coil waveforms with automatic spark advance with increased engine speed, force commutation of the electronic switch of the ignition circuit, automatic speed compensation for variations in temperature and lamination gap, prohibition of engine reversal and an extremely low impedance manual shut-off of the engine.

4 Claims, 18 Drawing Figures

(TRIGGER COIL VOLTAGE)

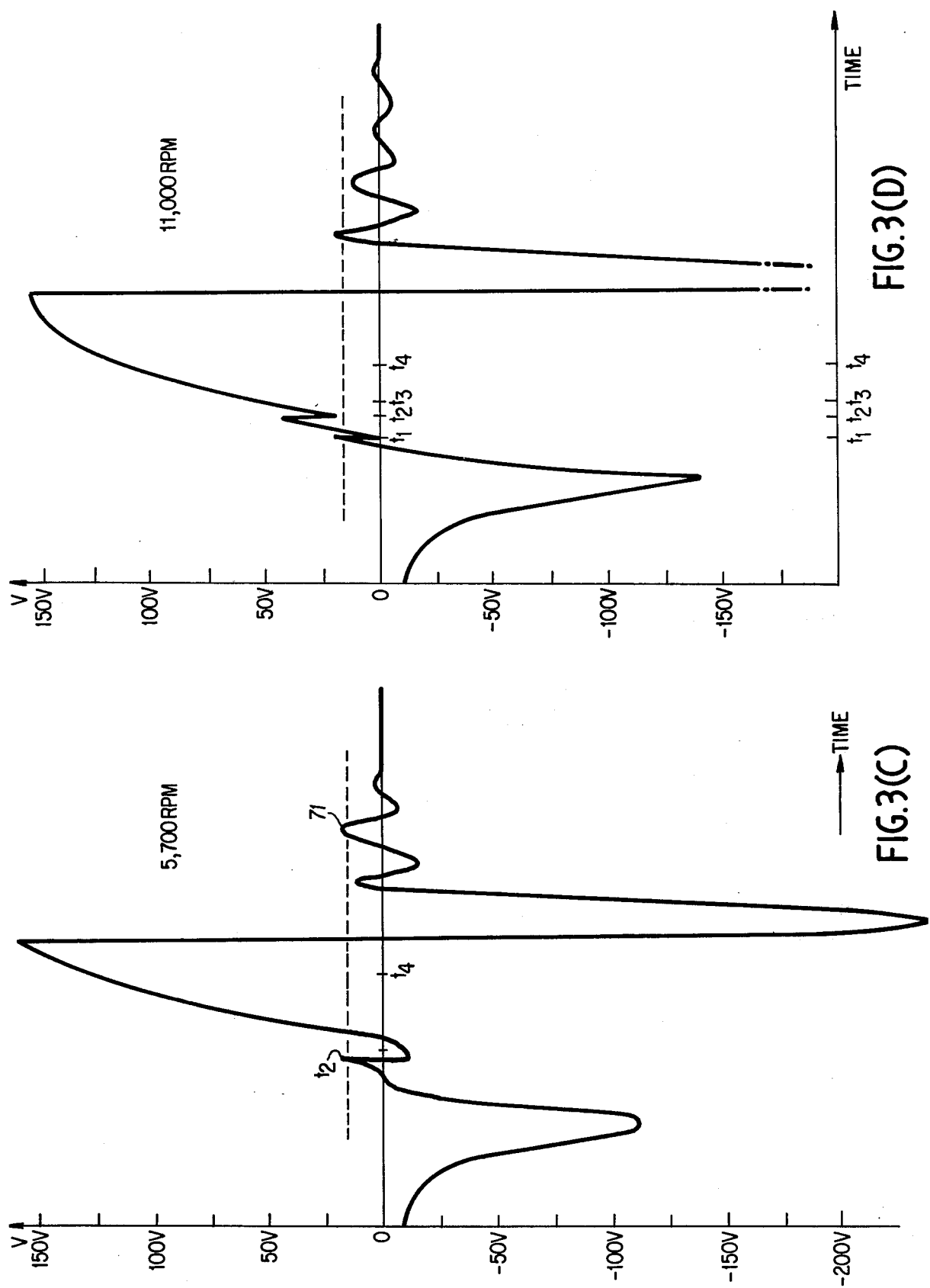

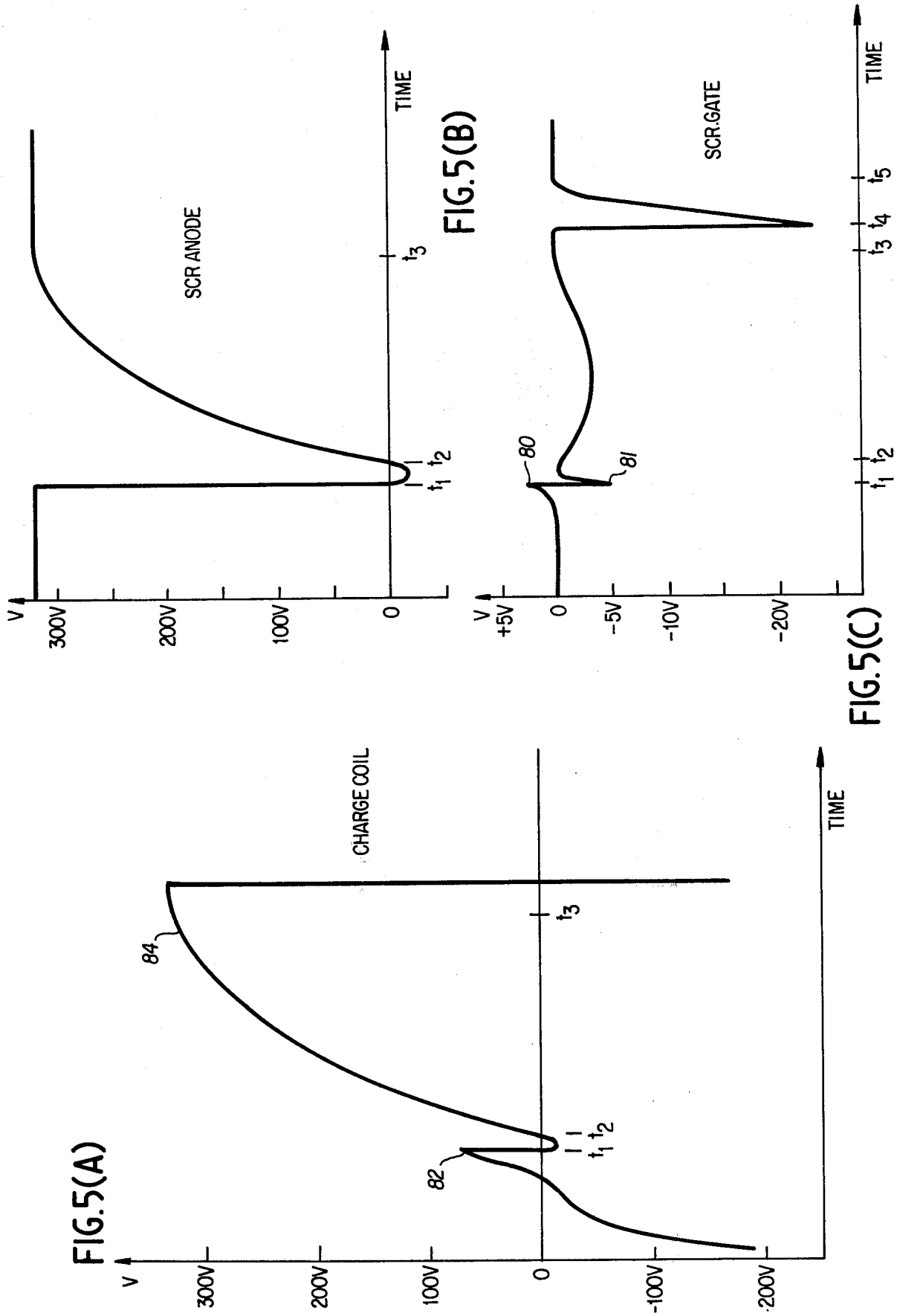

CAPACITOR DISCHARGE IGNITION CIRCUIT

BACKGROUND OF THE INVENTION

The present invention is directed to a capacitor discharge ignition system and more specifically to a capacitor discharge ignition system having automatic spark advance with engine speed, force communication of the electronic switch in the ignition circuit, automatic speed compensation for variations in temperature and lamination gap, prohibition of engine reversal and an extremely low impedance manual shutoff.

Capacitor discharge ignition systems are well known in which a flywheel magnet is rotated into and out of flux cutting proximity to one coil for effecting the charge of an ignition capacitor and to another coil for effecting the triggering of an electronic switch discharging the ignition capacitor through a high voltage transformer to a gap ignition device of the engine. Such systems generally require the physical displacement of the charging and trigger coils to thereby provide the necessary timing between the charging and discharging of the capacitor responsively to engine rotation.

Attempts to place both the charging and trigger coils on the same core lamination have generally required that the waveforms be 180° out-of-phase to achieve the necessary temporal displacement of the positive components of the current waveforms induced in the two coils. Out-of-phase waveforms, however, are a disadvantage in that the second wave component of the four major wave components of an induced waveform is the component with the greater energy. The second component is thus far more desirable for both charging and triggering purposes. Inversion of one of the waveforms requires the utilization of the third wave component for either the charging or triggering function.

Attempts to utilize in-phase charging and trigger waveforms on the same core lamination generally results in switch conduction as a result of the trigger coil waveform during the time interval during which energy is available from the charging coil to charge the ignition capacitor. Unless, however, the energy in the charging current waveform can be accumulated and suddenly released through the high voltage transformer, the potential applied to the ignition device will not be sufficient for gap ionization and the engine cannot run.

It is accordingly an object of the present invention to provide a novel method and capacitor discharge ignition system utilizing in-phase charging and trigger coil waveforms so that the high energy content of the second wave component may be utilized for both charging of the ignition capacitor and for triggering the elecronic switch effecting the discharge thereof.

The utilization of in-phase charging and trigger waveforms may be made possible in the present invention by the back biasing of the electronic switch immediately after the discharge of the ignition capacitor so that the ignition capacitor may be again charged by the same wave component that effected triggering of the electronic switch. It is accordingly a further object of the present invention to provide a novel method and capacitor discharge ignition circuit which automatically effects the back biasing of an electronic switch in the ignition circuit immediately after the firing thereof.

Another problem in the utilization of SCRs in capacitor discharge ignition systems has been the difficulty in insuring that the SCR immediately turns off after discharge of the ignition capacitor. Failure of the SCR to turn off prevents charging of the capacitor to a potential sufficient for gap ionization of the ignition device. It is accordingly another object of the present invention to provide a novel method and apparatus for force communication of the SCR to insure the nonconduction thereof immediately after discharge of the ignition capacitor.

It is also a desiratum that the time of occurrence of the spark of an internal combustion engine be advanced with an increase in engine speed, i.e., that the spark occurs earlier in the engine cycle as the speed of the engine increases. It is yet another object of the present invention to provide a novel method and circuit for automatically advancing the spark current of a capacitor discharge ignition system as a function of engine speed.

Capacitor discharge ignition systems are frequently utilized on machinery such as chain saws and the like in which operation of the engine at an excessive speed is detrimental to engine longevity. It is thus desirous that engine speed be limited for design considerations to a predetermined maximum. It is yet a further object of the present invention to provide a novel method and capacitor discharge ignition circuit in which the frequency of spark occurrence is automatically limited as a function of engine speed to thereby limit the speed of the engine.

Variations in ambient temperature and in the spacing of the legs of the laminated core on which the charging and trigger coils are mounted near the flywheel magnet vary the timing of the ignition circuit and thus produce variations in engine speed which are undesirable. It is still a further object of the present invention to provide a novel method and capacitor discharge ignition circuit for automatically compensating a capacitor discharge ignition system for variations in temperature and in lamination gap. It is yet still a further object of the present invention to effect the automatic compensation for variations in lamination gap despite even the intentional twisting of the core by an operator for the purpose of varying engine speed.

As described and claimed in the copending application Ser. No. 514,603 filed Oct. 15, 1974, by the assignee of the present invention, a coil may be provided to generate a waveform in-phase with the charging coil waveform for the purpose of insuring electronic switch conduction during the time interval when the capacitor is normally charged. Shut-off of the engine is thus achieved. However, a problem may arise in that the manual switch contacts utilized to selectively couple the shutoff coil into the circuit are often subject to an accumulation of moisture laden debris such as sawdust. It is yet still another object of the present invention to provide a novel method and capacitor discharge ingnition system shutoff apparatus which requires an extremely low impedance manually operable switch. The likelihood of the inadvertent effecting of engine shutoff by such debris is thus significantly reduced.

Still yet another object of the present invention is to provide a novel method and capacitor discharge ignition circuit in which shutoff of the engine may be achieved without the utilization of a shutoff coil and without the interruption of the circuit between the charging coil and the ignition capacitor.

It is generally undesirable for an internal combustion engine to operate in alternative directions and is yet still another object of the present invention to provide a novel method and capacitor discharge ignition system in which engine reversal is automatically prohibited.

These and many other objects of the present invention will become apparent to one skilled in the art to which the invention pertains from a perusal of the following detailed described when read in conjunction with the appended drawings.

THE DRAWINGS

Figure 4A:
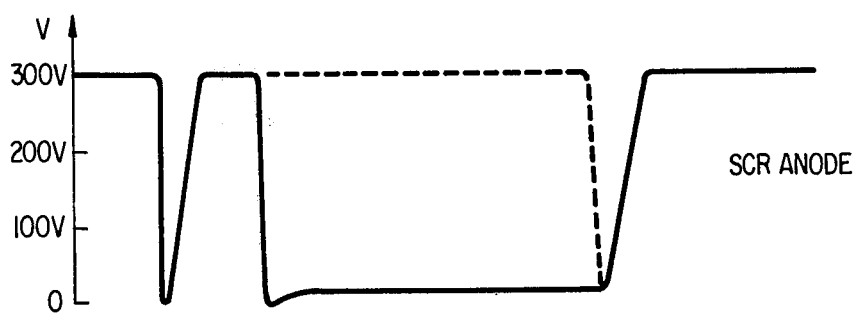
Figure 4B:
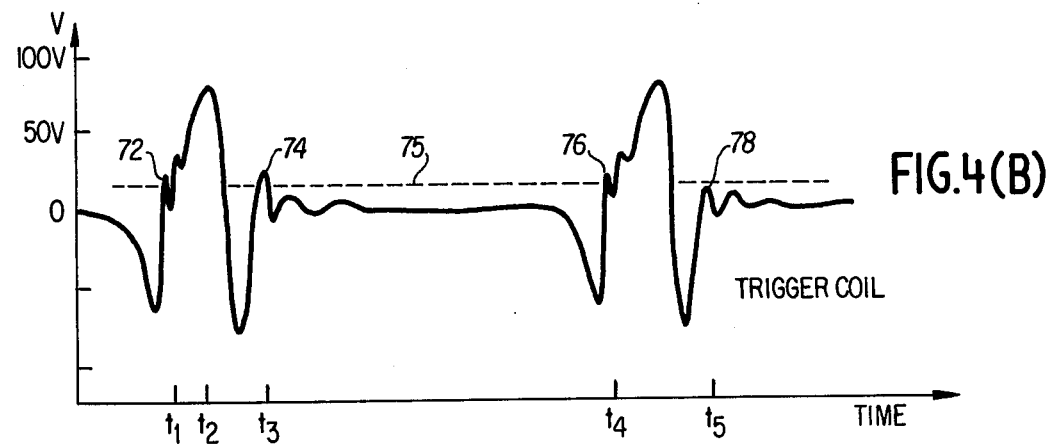
Figure 6B:
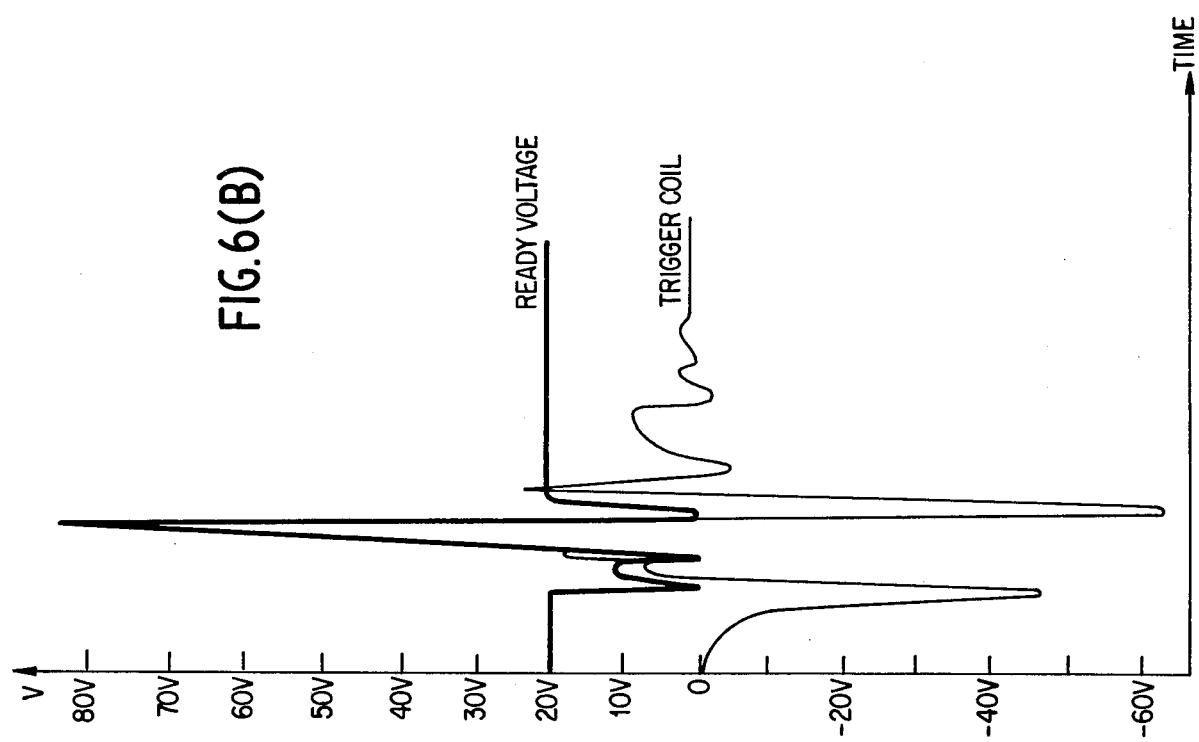
Figure 6A:
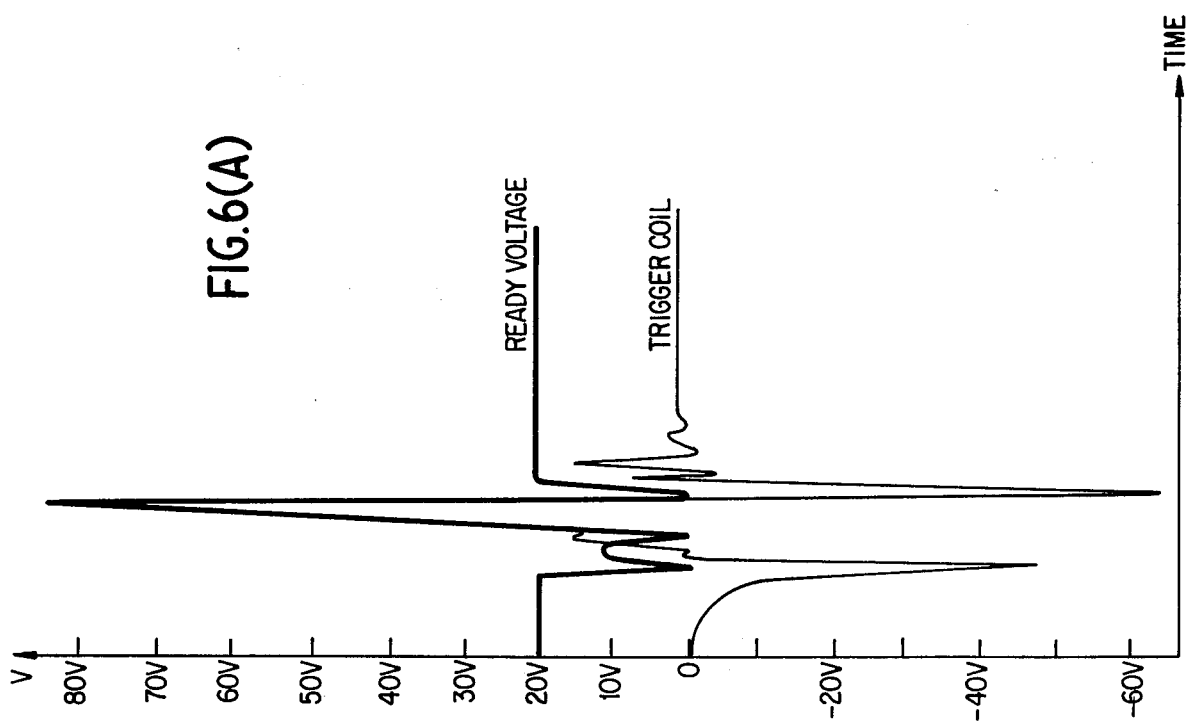
Figure 7A:
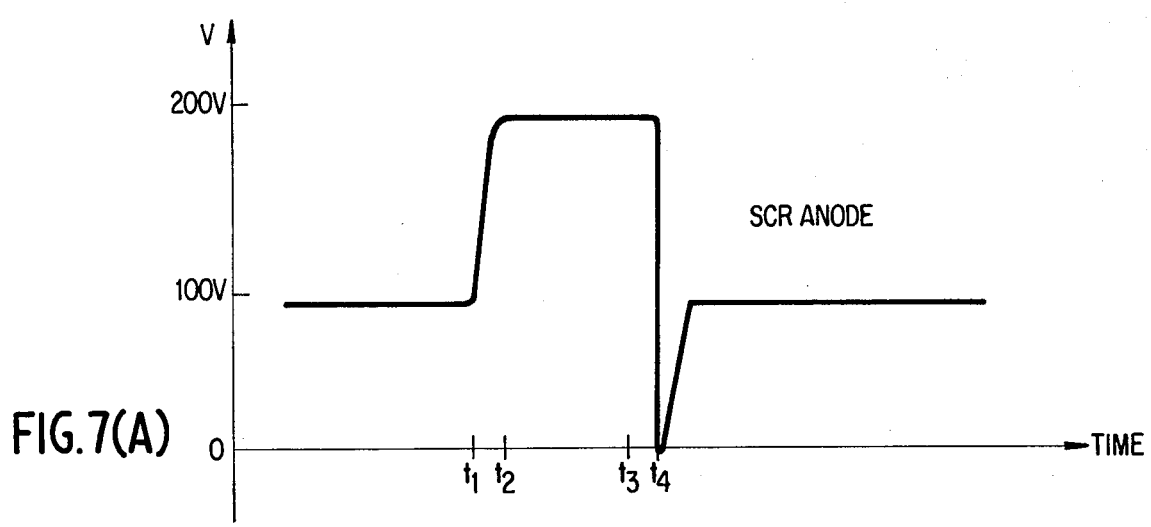
Figure 7B:
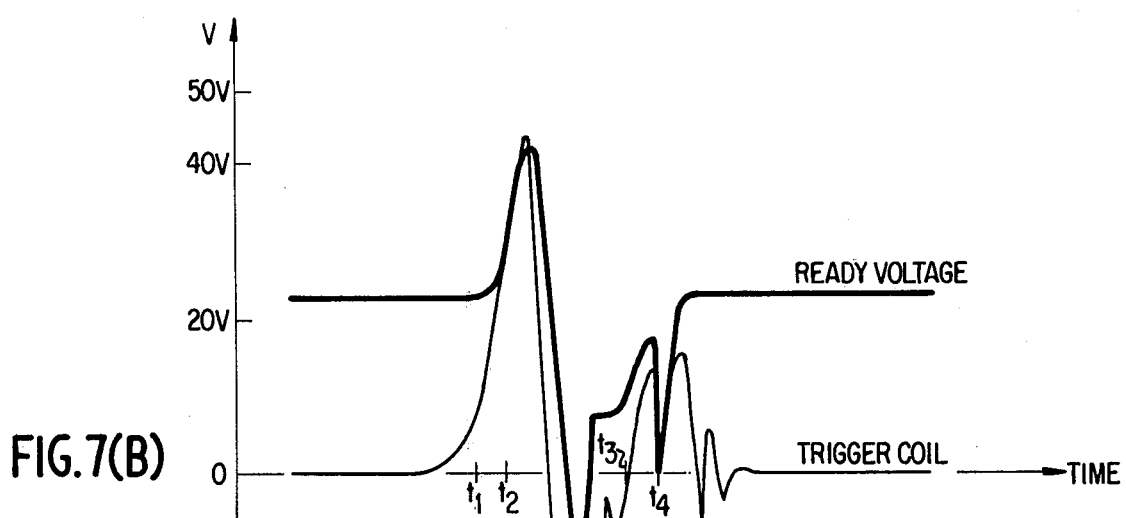
Figure 7C:
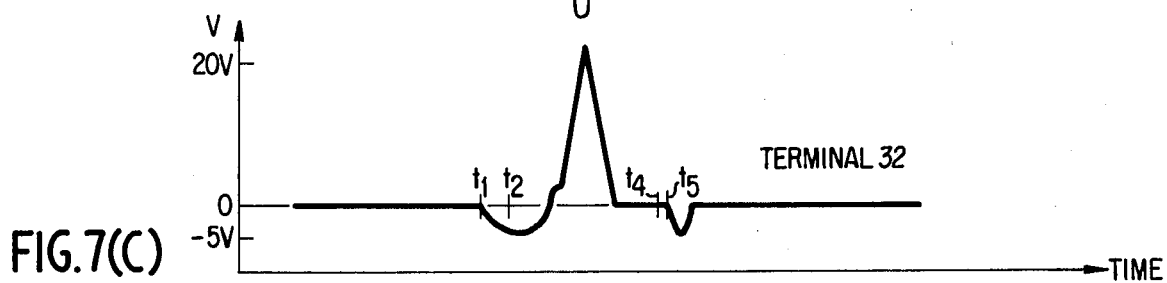

FIGS. 3(A) through 3(D) inclusive are illustrations of the anode voltage of the SCR and the trigger coil voltage by in-phase charging and trigger coils;

FIGS. 4(A) and 4(B) are waveforms illustrating the governing function of the circuit of the present invention;

FIGS. 5(A) through 5(C) inclusive are waveforms illustrating back biasing of the SCR gate electrode;

FIGS. 6(A) and 6(B) are waveforms illustrating the effects of engine speed on the trigger coil voltage; and, FIGS. 7(A) through 7(C) inclusive are waveforms illustrating the inoperativeness of the engine in the reverse direction.

DETAILED DESCRIPTION

To facilitate an understanding of the circuit of the present invention and the various functions performed thereby, reference may be had to the following detailed description of the circuit and its operation to perform the various functions.

THE CIRCUIT

Figure 1:
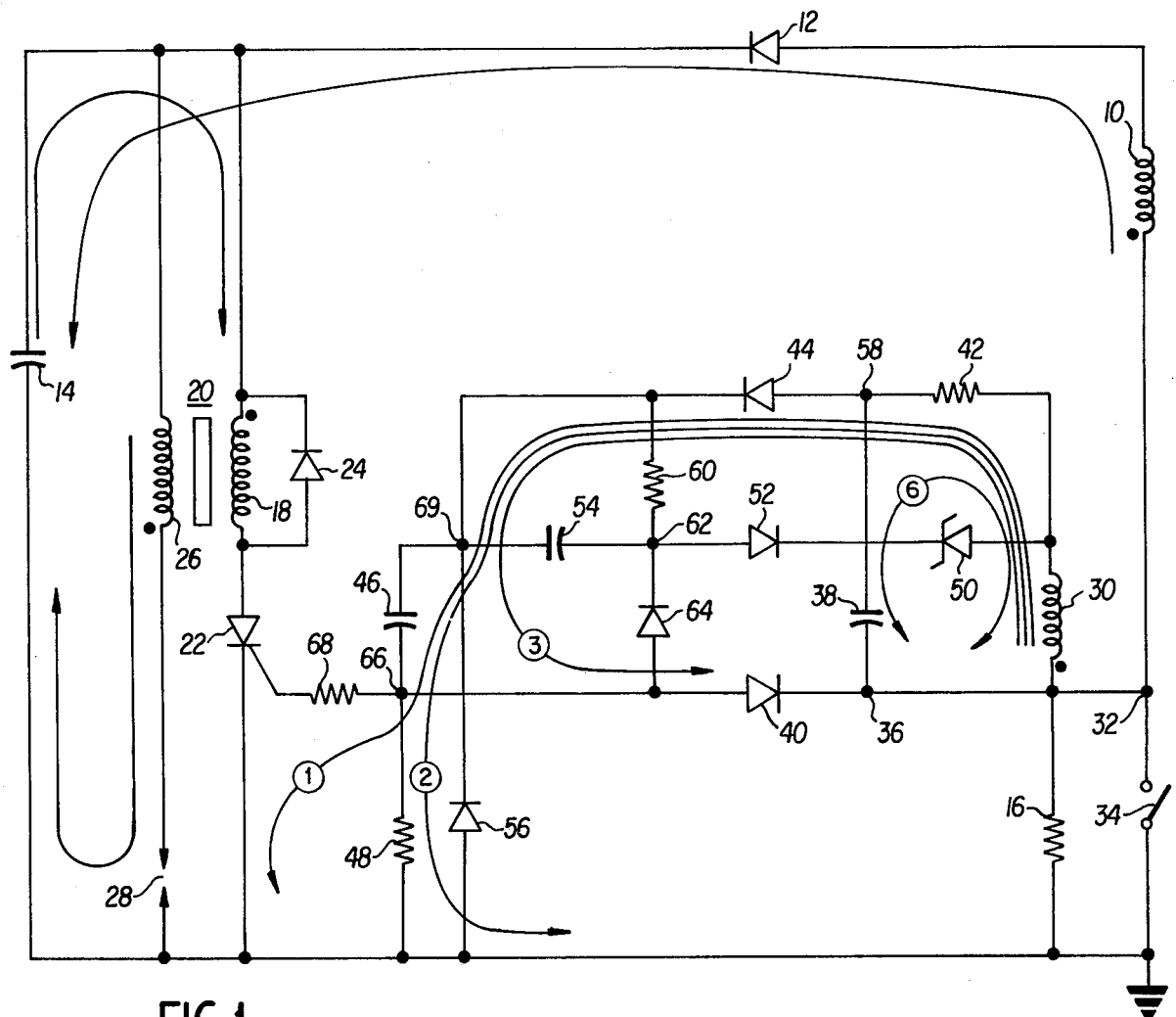
FIG. 1 is a schematic circuit diagram of the circuit of the present invention illustrating certain current paths.
Figure 2A:
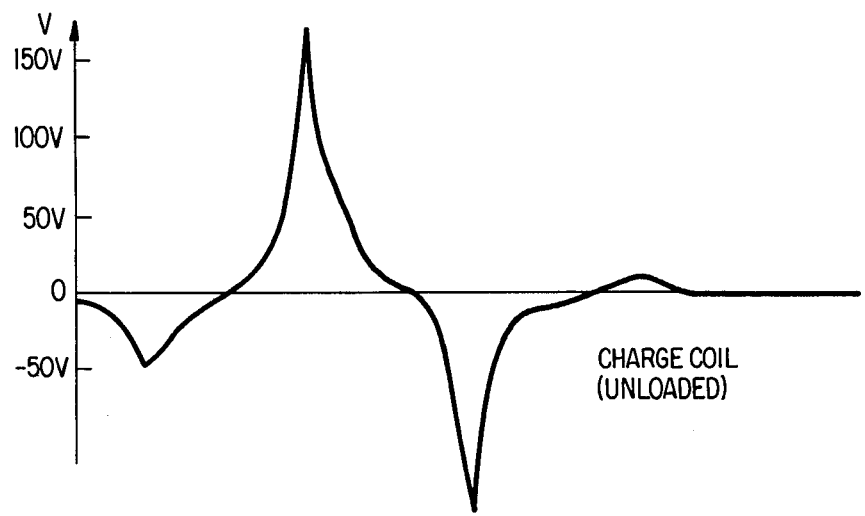
FIG. 2 is a timing diagram illustrating the four principal wave components of the unloaded charge and trigger coil waveforms.

With reference to FIG. 1, the charging coil 10 of the present invention may comprise 2,000 turns of No. 34 wire and may be connected in a charging circuit including a diode 12, an ignition capacitor 14 and a resistor 16. Rotation of the flywheel magnet of the engine into and out of flux cutting proximity to the charging coil 10 will operate in the conventional manner to induce a voltage in the coil having the form shown generally in FIG. 2(A), i.e., having a small negative component, a large positive component, a large negative component and a small positive component in that order. The current generated responsively to the first positive component of the voltage waveform illustrated in FIG. 2(A) will be passed through the diode 12 to effect the charging of the capacitor 14 to ignition potential. The diode 12 will block the passage of the current generated by the negative components of the induced voltage waveform illustrated in FIG. 2(A).

With continued reference to FIG. 1, the ignition capacitor 14 is connected in a discharge circuit including the primary winding 18 of a high voltage transformer 20 and an electronic switch such as the illustrated SCR 22. When triggered into conduction by the application of a positive potential to the gate electrode at a time that the SCR 22 has a positive to negative anode to cathode bias, the SCR 22 will effect the discharge of the capacitor 14 through the primary winding 18 of the transformer 20 which may comprise 100 turns of No. 26 wire in the example illustrated in FIG. 1. A commutating diode 24 may be connected across the primary winding 18 of the transformer 20 in a conventional manner.

The discharge of the ignition capacitor 14 through the primary winding 18 of the high voltage transformer 20 will generate a current in the secondary winding 26 of the transformer 20. This secondary winding 26 may comprise 6,000 turns of No. 40 wire in the exemplary circuit of FIG. 1 and is connected in series with a conventional gap ignition device such as a spark plug 28 so that gap ionizing potential may be applied thereto for engine ignition purposes.

With continued reference to FIG. 1, a trigger coil 30 comprising 510 turns of No. 34 wire may be coaxially wound with the charging coil 10 on the same leg of a laminated core so that the voltage induced therein by the passage of the flywheel magnet into and out of flux cutting proximity thereto will be in phase with the voltage induced in the charging coil 10. As can be noted by a comparison of FIG. 2(A) with FIG. 2(B), the voltage waveforms are substantially identical in shape and differ only in the amplitude as a function of the number of turns respectively selected for the two coils.

The trigger coil 30 is connected to the gate electrode of the SCR 22 by the novel circuit of the present invention. The start end of the trigger coil 30 may be grounded through a resistor 16 and also connected to a terminal 32 intermediate the start end of the charging coil 10 and one contact of a suitable conventional mechanical switch 34. The start end of the trigger coil 10 is also directly connected to a terminal 36 intermediate a capacitor 38 and the cathode of a diode 40. The finish end of of the trigger coil 30 may be grounded through a resistor 42, a diode 44, a capacitor 46 and a current limiting resistor 68 to the gate electrode of the SCR 22 so that a current path for the trigger voltage is established through ground and the resistor 16 to the start end of the trigger coil 30.

The resistor 68 and SCR gate electrode of this first current path are shunted by a resistor 48 to thereby establish a second current path from the finish end of the trigger coil 30 through the resistor 42, the diode 44, the capacitor 46, the resistor 48, grounded and the resistor 16 to the start end of the trigger coil 30.

The resistor 48 and the resistor 16 of this second current path are shunted by a diode 40 to thereby establish a third current path from the finish end of the trigger coil 30 through the resistor 42, the diode 44, the capacitor 46 and the diode 40 to the start end of the trigger coil 30.

Figure 1A:
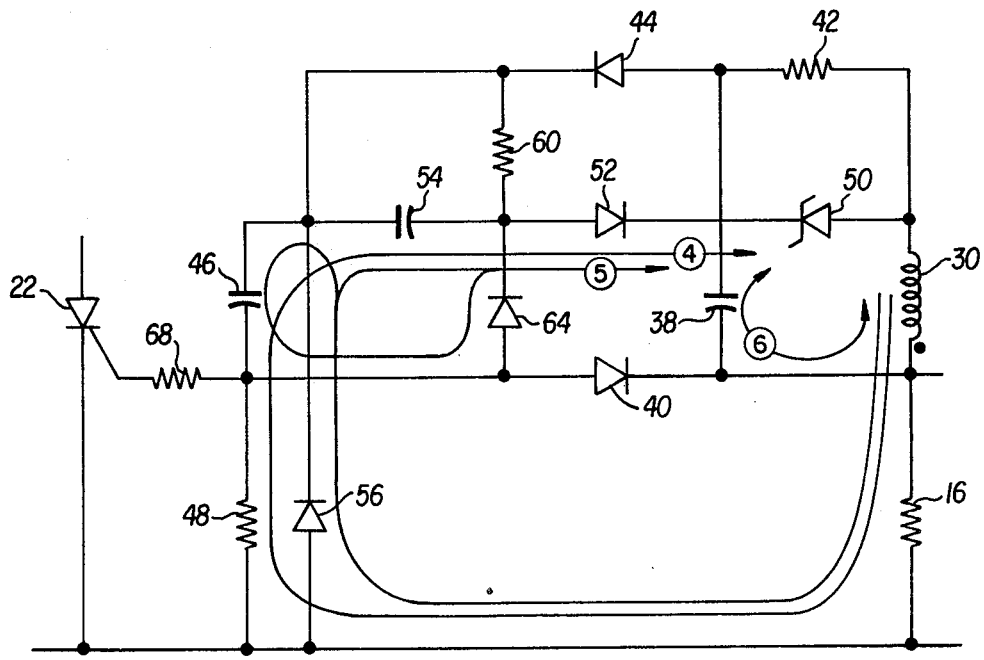
FIG. 1(A) is a portion of the circuit of FIG. 1 illustrating other current paths.

As shown more clearly in FIG. 1(A) where a portion of the circuit of FIG. 1 is again illustrated in the interest of clarity, a fourth current path is established from the start end of the trigger coil 30 through the resistor 16, ground, the resistor 48, the capacitors 46 and 54, the diode 52 and the Zener diode 50 to the finish end of the trigger coil 30.

With continued reference to FIG. 1(A), a fifth current path is established from the start end of the trigger coil 30 through the resistor 16, ground, the diode 56, a parallel circuit having capacitor 46 and diode 64 in one leg thereof and the capacitor 54 in the other leg thereof, the diode 52 and the Zener diode 50 to the finish end of the trigger coil 30.

A sixth current path is established by the connection of the capacitor 38 between the start end of the trigger coil 30 and a terminal 58 at the interconnection of the resistor 42 and the anode of the diode 44. This current path permits oscillations by the transfer of energy between the trigger coil 30 and the capacitor 38 damped, of course, by the value of the resistor 42 as well as the other current loops earlier described. In addition to this damping, the other loops play a major part in the shaping or forming of the waveforms as will be subsequently explained.

Exemplary values for the circuit illustrated in FIG. 1 may be as indicated in the following Table:

TABLE

| Component | | Value |
| --- | --- | --- |
| Resistor | 16 | 10 ohms |
| " | 42 | 120 ohms |
| " | 48 | 120 ohms |
| " | 54 | 1000 ohms |
| " | 68 | 47 ohms |
| Diode | 12 | 1000 volts |
| " | 24 | 600 volts |
| " | 40 | 50 volts |
| " | 44 | 100 volts |
| " | 52 | 50 volts |
| " | 56 | |
| Capacitor | 14 | 0.68 microfarad, 400 volts |
| " | 38 | 0.15 microfarad, 100 volts |
| " | 46 | 0.22 microfarad, 100 volts |
| " | 54 | 1.0 microfarad, 50 volts |
| Zener diode | 50 | 39 volts |

AUTOMATIC SPARK ADVANCE WITH SPEED INCREASES

The operation of the circuit of the present invention in automatically advancing the spark with an increase in engine speed may more easily be understood by reference to the waveforms appearing in the circuit of FIG. 1 at different engine speeds.

Figure 2B:
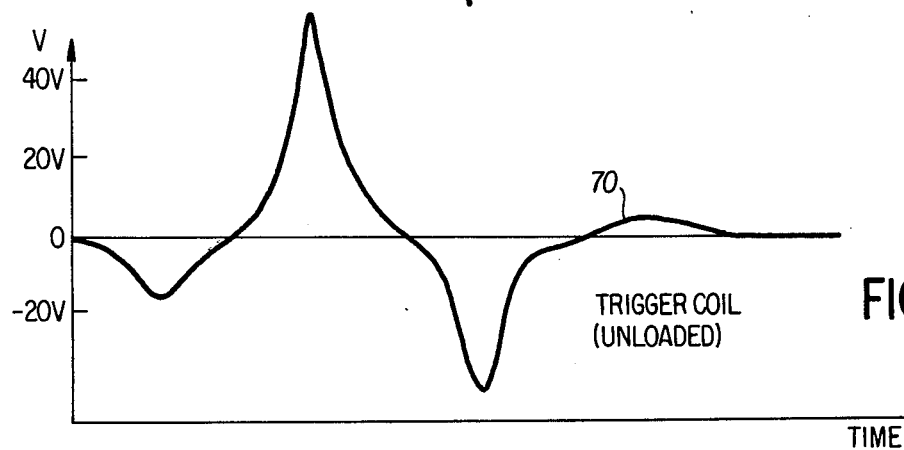
Figure 3A:
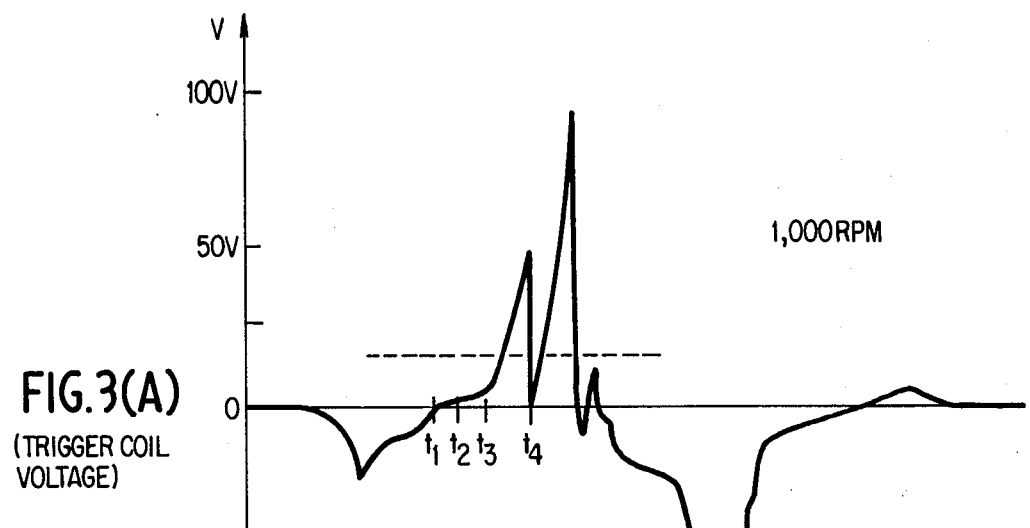

With reference to FIG. 3 and more specifically to FIG. 3(A), the first positive component of the trigger coil 30 waveform illustrated in FIG. 2(B) separates into three portions or spikes at an engine speed of approximately 1,000 rpm. As shown in FIG. 3(A), the first of these three positive spikes has sufficient amplitude to exceed the ready voltage illustrated in dashed lines and thus to effect the triggering of the SCR 22 in the circuit of FIG. 1 at a time $t_4$.

Figure 3B:
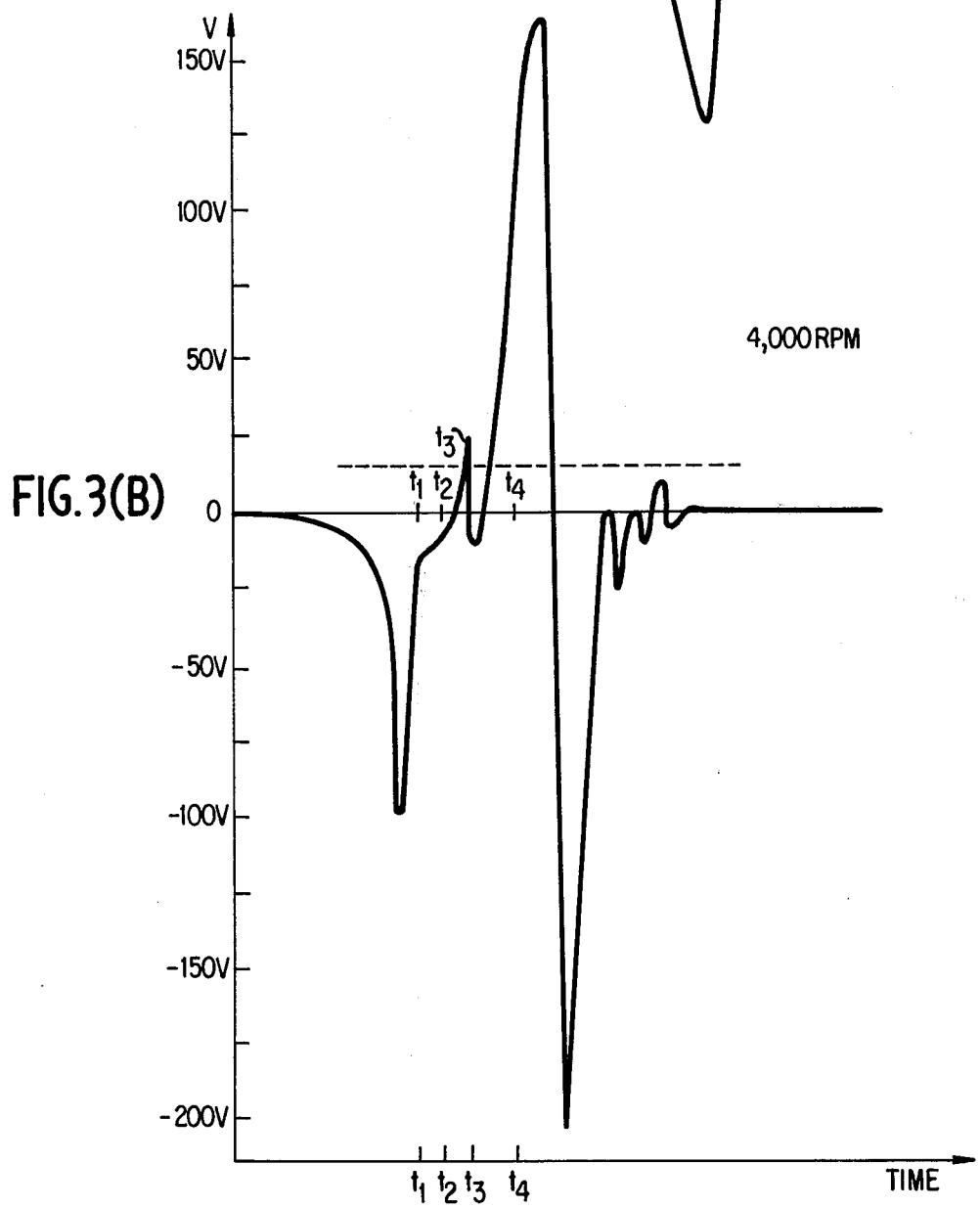

This waveform changes materially with an increase in engine speed and, as illustrated in FIG. 3(B), the first positive component comprises only two spikes at an engine speed of approximately 4,000 rpm. From a comparison of the waveforms of FIG. 3(A) and FIG. 3(B), it is apparent that the occurrence of the initial spike of the first positive component at time $t_3$ is advanced in time with an increase in speed. The amplitude of the first positive spike is sufficient to effect triggering of the SCR 22 and the engine spark is thereby automatically advanced in the cycle from time $t_4$ to time $t_3$.

Additional energy will be shifted from the first spike to the second spike with a further increase in engine speed and the first spike will be further advanced. As illustrated in FIG. 3(C), the amplitude of the first spike is sufficient to effect the triggering of the SCR 22 at a time $t_2$ at an engine speed of 5,700 rpm.

As can be seen from FIG. 3(D), the first positive wave component includes a plurality of small spikes on the leading edge of the waveform. The amplitude of the first of these spikes is, however, sufficient to exceed the ready voltage at time $t_1$ and the engine spark is automatically advanced from time $t_2$ to time $t_1$ with the increase in engine speed.

The circuit of the present invention not only advances the engine spark with an increase in engine speed by the modification of the trigger coil waveform as illustrated in FIG. 3, but also permits the utilization of in-phase waveforms for triggering and capacitor charging purposes.

AUTOMATIC ENGINE SPEED LIMITING

The operation of the circuit of the present invention to automatically limit the speed of the engine may more easily be understood by reference to the waveforms appearing in the circuit of FIG. 1 at different engine speeds.

With continued reference to FIG. 3, the second positive component comprises a series of relatively minor oscillations. These oscillations include a standing wave which is the second positive component of the unloaded waveforms illustrated in FIG. 2. These oscillations include as well the damped oscillations resulting from ringing in the sixth current path including the trigger coil 30, the resistor 42 and the capacitor 38 as described in the circuit of FIG. 1.

The amplitude and temporal position of these later oscillations vary with variations in engine speed. As can be noted from the waveforms of FIG. 3, an increase in engine speed increases the amplitude of the oscillations until the phase relationship with respect to the standing wave or second positive component of the waveforms of FIG. 1 is additive to produce a waveform such as illustrated in FIG. 3(C) in which at least one of the positive components, e.g., spike 71, has sufficient amplitude to effect the triggering of the SCR 22. The worst case for this phenomenon is the second harmonic and the circuit of the present invention substantially filters out this harmonic to prevent the immediate discharge of the capacitor 14 by the second positive component immediately after the charging thereof by the first positive component.

At the predetermined desired speed selected by the selection of component values as will hereinafter be described, the oscillations produced by the ringing between the inductance of the trigger coil 30 and the capacitance of the capacitor 38 achieves a first harmonic resonance with the second positive component 70 of the waveform illustrated in FIG. 2(B). This phenomenon is illustrated in FIG. 3(D) at an engine speed of about 11,000 rpm. As a result, the SCR 22 is triggered approximately 70° after the normal firing position. Combustion will not, however, be achieved because the combustible mix within the cylinder has already been burned and has not been replaced at this point in the cycle of the engine.

With reference now to FIG. 4, the waveform of FIG. 4(A) represents the potential on the anode of the SCR, i.e., the charge on the ignition capacitor 14 of the circuit of FIG. 1. Capacitor 14 is charged by the first positive component of the waveform of FIG. 2(A). With the occurrence of the first positive spike 72 of the first positive component of the trigger coil waveform illustrated in FIG. 4(B) at time $t_1$, the charge on the ignition capacitor becomes substantially zero as the capacitor 14 is discharged through the transformer 20 of the circuit of FIG. 1. The SCR 22 is immediately force commutated as will subsequently be described and, as shown in FIG. 4(A), the capacitor 14 is immediately charged to a potential sufficient to effect gap ionization through the transformer at time $t_2$ by the remainder of the first positive component of the charge coil waveform.

With continued reference to FIG. 4, the first positive spike 74 of the second positive component of the trigger coil waveform illustrated in FIG. 4(B) exceeds the illustrated "ready voltage" or threshold level 75 and effects the triggering of the SCR 22 to discharge the capacitor 14 at time $t_3$. Ignition will not occur at time $t_3$ despite the discharge of the capacitor 14 due to the absence of combustible gasses in the cylinder of the engine at that time.

Upon the occurrence of the first positive spike 76 of the first positive component of the trigger coil waveform at time $t_4$, i.e., the normal time of ignition, the SCR 22 is triggered but ignition will not occur despite the presence of combustion gasses within the cylinder of the engine because there is insufficient charge on the ignition capacitor 14 to produce the necessary spark. The ignition capacitor 14 is, however, thereafter immediately charged by the rest of the first positive component of the charge coil waveform for subsequent firing at the next normal time.

The loss of combustion or misfire achieved by the early dumping of the charge of the ignition capacitor should effect a reduction in engine speed which will in turn change the waveform of the trigger coil voltage by eliminating the first harmonic resonant condition. The elimination of the first harmonic resonant condition will reduce the amplitude of the spike 78 below the ready voltage 75, i.e., the voltage required to trigger the SCR 22 so that the capacitor 14 will be charged at the occurrence of the first positive spike of the first positive component of the trigger coil waveform at the next cycle. The engine may thus continue at the reduced speed.

In the event that the speed of the engine is not sufficiently reduced by a single misfire to eliminate the resonant condition, the amplitude of the spike 78 in the waveform of FIG. 5(B) would be sufficient to again dump the charge of the ignition capacitor at time $t_5$ and thus effect a second misfire. Two consecutive misfires should eliminate the resonant condition. The second dumping will not effect combustion even if the cyclinder is charged with combustion gases because the ignition spark occurs too late in expansion stroke of the engine.

BACK BIASING OF THE SCR

As earlier discussed, the simultaneously occurring first position components of the trigger and charge coils 30 and 10 are utilized respectively for triggering the SCR 22 and charging the ignition capacitor 14. This requires that the SCR 22 be back biased during the portion of the first positive component of the charge coil waveform following the first spike.

With reference to FIGS. 1 and 5, the first positive component of the charge coil voltage waveform is illustrated in FIG. 5(A) and the charge of the ignition capacitor 14, i.e., the potential of the anode of the SCR 22, is illustrated in FIG. 5(B). As illustrated in FIG. 4(B), the SCR anode potential is slightly in excess of 300 volts from the charging of the ignition capacitor 14 in the immediately preceding cycle until the firing of the SCR 22 at time $t_1$ by the spike 80 of the voltage of the SCR gate electrode voltage illustrated in FIG. 5(C). As shown in FIG. 5(B), the charge of the capacitor 14 is almost instantaneously dissipated and, when the SCR is force commutated, the anode voltage of the SCR (FIG. 5(B)) again begins to rise as a result of the charging of the ignition capacitor 14 by the major portion 84 of the first positive component of the charge coil waveform following the positive spike 32 (see FIG. 5(A)).

With the presence of an increasing voltage on the SCR anode in the period between time $t_2$ and $t_3$ as illustrated in FIG. 5(B), the SCR 22 will conduct as the gate electrode potential also rises with the rising charge coil waveform illustrated in FIG. 5(A). To prevent conduction of the SCR 22 during this time interval, the gate electrode of the SCR 22 must be back biased as illustrated in FIG. 5(C).

With reference again to FIG. 1 and to the illustrated current paths 1 and 2, the current induced in the trigger coil 30 passes through the circuit including the resistor 42, the diode 44, the capacitor 46, the resistor 68 and SCR 22 in parallel with the resistor 48, and then through the resistor 16. The potential at the terminal 66 beings to rise with the passage of current from the terminal 66 to ground. As the potential at the terminal 66 rises, so does the potential at the gate electrode of the SCR 22 as indicated in FIG. 5(C) as the spike 80. With continued reference to FIG. 5(C), the SCR gate potential rises until the SCR 22 fires at time $t_1$ at which time the gate is immediately grounded through the SCR 22. The discharge of the inherent capacitance of the charging coil 10 through the resistor 16 produces a voltage drop across the resistor 16. Since one end of the resistor 16 is grounded, terminal 32 becomes negative to produce the negative spike 81 at the time of firing of the SCR 22. Upon the force commutation of the SCR 22 by the spark current as will hereinafter be described, the potential of the gate electrode again begins to rise.

With the flow of current, i.e., about 400 milliamps, from the 300 volt positive potential of the charging coil 10, the voltage drop across the resistor 16 is about 4 volts and this negative 4 volt potential at the terminal 32 is reflected through the diode 40 and the resistor 68 to reduce the potential at the gate electrode of the SCR 22 as is illustrated in FIG. 5(C). When the current through the resistor 16 ceases as a result of the charging of the capacitor 14 at time $t_3$, the voltage drop across the resistor 16 is eliminated and the back biasing removed from the gate electrode of the SCR 22.

During this same time interval, the 70 to 80 volt positive potential of the trigger coil 30 effects the charging of the capacitor 46 through the third current path earlier discussed in connection with FIG. 1. This increasing charge on the capacitor 46 would effect the triggering of the SCR 22 if the start end of the trigger coil 30 was not directly connected to the start end of the charging coil 10 and negative with respect to the cathode of the SCR 22 as a result of the 4 volt drop across the resistor 16.

With the reversal of the current from the trigger coil 30 at time $t_4$ as a result of the movement of the flywheel magnet (see FIG. 5(A)), the potential of the gate immediately goes negative and the charge on the capacitor 46 is dissipated into the capacitor 54 through the diode 52, the Zener diode 50, the trigger coil 30, and the resistors 16 and 48. The charge on the capacitor 54 is thereafter dissipated through the resistor 60 to again achieve a substantially zero potential on the gate electrode of the SCR 22 at time $t_5$. The extent of the back biasing is thus directly related to the current flowing into the capacitor 46.

FORCE COMMUTATION OF THE SCR

With reference again to FIG. 1, the firing of the SCR 22 discharges the ignition capacitor 14 through the primary winding 18 of the transformer 20. By virtue of the action of the transformer 20, gap ionizing potential for the ignition device 28 is provided and spark current flows. This spark current passes from the start end of the secondary winding 26 of the transformer through the ignition device 28 and ignition capacitor 14 to the finish end of the winding 26 and almost immediately effects charging of the capacitor 14 in the reverse direction. The negative charge thus achieved on the capacitor 14 effects the immediate commutation of the SCR 22 by reducing the anode potential thereof with respect to the cathode potential.

The large voltage drop across the SCR 22 is thus limited to the time required to dissipate the capacitor 14 charge through the primary winding 18 of the transformer 20, i.e., about 12 microseconds. The anode of the SCR remains at a positive 5 volt potential until the spark current effects a negative charge of about 7 volts on the ignition capacitor 14. Since the resultant negative 2 volt potential on the anode of the SCR is lower than the ground potential of the cathode, the SCR 22 is commutated so that the ignition capacitor 14 may be immediately charged by portion 84 of the first positive wave component of the waveform of FIG. 5(A).

AUTOMATIC COMPENSATION FOR VARIATIONS IN TEMPERATURE AND LAMINATION GAP

Variations in engine speed with temperature are undesirable and temperature compensation is achieved in the circuit of FIG. 1 by the diode 40 and the Zener diode 50. An increase in temperature normally provides a reduction in speed. However, an increase in temperature also reduces the impedance of the diode 40. The potential at the terminal 66, and thus at the gate electrode of the SCR 22, is a function of the voltage drop across the resistor 48 and the series connected diode 40 and the resistor 16. The value of the resistor 48 is an order of magnitude higher than the value of the resistor 16 and the effect of the resistor 16 may thus be ignored so that the impedance of the diode 40 is thus controlling. Since the impedance of the diode 40 changes in substantially the same manner as the impedance of the SCR 22, the decrease in the impedance of the diode 40 with an increase in temperature will reduce the potential at the terminal 66. The SCR 22 is thus shunted by an impedance substantially constant relative to the impedance of the SCR.

An increase in temperature also increases the impedance of the Zener diode 50. As a result, the capacitor 46 is discharged to a lesser extent upon reversal of the trigger coil waveform. Since the potential at the terminal 66 is a function of the charge in the capacitor 46, the potential at the terminal 66 varies with the impedance of the Zener diode 50. The responsiveness of the impedance of the Zener diode 50 is not linear but significantly adds in effecting temperature compensation. It has been found that a temperature variation from 72° F. to 230° F. has produced a speed variation of less than 100 rpm with the circuit of FIG. 1.

Movement of the core toward or away from the flywheel of the engine normally produces a speed variation by changing the shape of the trigger and charging coil waveforms. However, the capacitor 46 and the capacitor 54 form a capacitive voltage divider in the forth current path earlier described in connection with the circuit of FIG. 1. As a result, a reduction in the trigger coil voltage also reduces the charge on the capacitor 46, i.e., the "ready voltage", to maintain a substantially constant ratio of ready voltage to trigger coil voltage. The circuit of the present invention is thus substantially tamper proof and the efforts of an operator to increase the speed of the engine by movement of the core will be frustrated.

Should the operator attempt to twist the core to vary only the gap of the trailing leg of the laminations and thereby affect the amplitude of the ringing oscillations without affecting the amplitude of the first positive wave component, the circuit of FIG. 1 provides an automatic gain control function by virtue of the diode 56 and the resistor 16. If the second negative component of the trigger coil waveform of FIG. 4(B) exceeds the value sufficient to discharge the capacitor 46 to the desired ready voltage level, the current will, as shown as the fifth current path illustrated in FIG. 1(A), pass from the trigger coil 30 through the resistor 16 and the diode 56 where it will divide between the capacitor 54 and the series connected capacitor 46 and diode 64 to combine again at the terminal 62 for passage back to the trigger coil 30 through the diode 52 and the Zener diode 50. As a result, the charge on the capacitor 46 will not continue to decrease but will in fact increase.

If the amplitude of the first positive component of trigger coil voltage of FIG. 4(B) is decreased by a twisting of a core or otherwise reducing the air gap of the leading leg of the core lamination, the capacitor 46 will not be recharged to the same extent thereby achieving a reduction in the ready voltage. A reduction in the ready voltage reduces the amplitude of the ringing oscillations necessary to achieve firing so that a substantially constant ratio of trigger voltage and ready voltage is again achieved.

ENGINE SHUTOFF

With reference to FIG. 1, the operation of the circuit heretofore described has assumed a condition in which the contacts of the manually operable switch 34 have remained in an open condition. The closure of the contacts of the switch 34 by the operator will insure engine shutoff.

As explained earlier in connection with FIG. 5(C), the potential at the terminal 66 and thus at the gate electrode of the SCR 22 is normally negative following discharge of the ignition capacitor, i.e., in the period between time $t_2$ and $t_3$ as a result of the passage of current from the charge coil 10 through the resistor 16. Closure of the contacts of the switch 34 effectively short circuits the resistor 16 thereby eliminating the voltage drop across the resistor 16. The potential at the terminal 32 is thus increased from 4 volts negative to ground. This increase in potential is reflected through the diode 40 and resistor 68 to the gate electrode of the SCR 22 and thus the back biasing of the gate electrode of the SCR 22 is eliminated.

Without the back biasing of the gate electrode as shown in FIG. 5(C), the SCR 22 remains conductive and the current from the charging coil 10 will be passed through the SCR as it is generated rather than being utilized to charge the ignition capacitor 14 to gap ionization potential. Since the value of the resistor 16 is quite small, i.e., approximately 10 ohms, the contacts of the switch 34 must be present, when closed, an impedance of less than 1 ohm. As a result, the application of mud or wet sawdust with a high pH factor to the switch will not effect a sufficient short circuit and the back biasing effects of the resistor 16 will not be removed from the circuit in the absence of the operator's intervention.

PROHIBITION OF ENGINE REVERSAL

With reference now to the trigger coil voltage of FIG. 7(B), a reversal in the direction of flywheel rotation will generate a voltage waveform having positive, negative, positive and negative wave components, i.e., a mirror image of the negative, positive, negative and positive wave components illustrated in the waveforms of FIG. 2. The simultaneously ocurring second positive components of the waveform of the charging coil will effect the charging of the ignition capacitor 14 to about 100 volts as illustrated in FIG. 7(A) and this charge will be retained until the next cycle at which time the first positive wave component will double the charge on the capacitor 14 as illustrated in FIG. 7(A) to a level of about 200 volts.

As earlier explained in connection with FIG. 6, the ready voltage follows the trigger coil voltage and will also increase as illustrated in FIG. 7(B). As a result, the ready voltage illustrated in FIG. 7(B) will not be exceeded by the first positive wave component of the trigger coil voltage illustrated in FIG. 7(B) at time $t_1$ when the charge coil current begins to flow through the resistor 16 to increase the SCR anode voltage as illustrated in FIG. 7(A). As described earlier in connection with FIG. 5, the flow of current through the resistor 16 will produce the waveform illustrated in FIG. 7(C) which back biases the SCR 22 gate electrode for the duration of the first positive wave component. Thus, the SCR 22 will be back biased when the trigger coil voltage equals the ready voltage as illustrated in FIG. 7(B) at time $t_2$.

The reversal of the trigger coil voltage with the first negative component will reduce the ready voltage as illustrated in FIG. 7(B). The potential of the trigger coil will again rise with the second positive component. Since the ready voltage has been reduced from the level of about 20 volts positive potential time $t_1$ when the first positive wave component of the trigger coil occurred by the first negative component of the trigger coil voltage to a potential of about 15 volts negative at time $t_3$ when the second positive wave component of the trigger coil occurs, the trigger coil voltage will exceed the ready voltage at time $t_4$ and the SCR 22 triggered into conduction.

As illustrated in FIG. 7(C), the SCR 22 is again back biased at time $t_5$ as a result of the second positive component of the charge coil voltage. Since the back biasing of the SCR occurs upon the flow of charge current through the resistor at time $t_5$ and since the trigger coil current flows at time $t_3$ as a result of the absence of a charge on the capacitor 46 from the preceding positive wave component, the trigger coil voltage will exceed the ready voltage at time $t_4$ and the SCR 22 will conduct.

As shown in FIG. 7(A), the anode voltage of the SCR will drop to substantially zero at time $t_4$ as a result of the firing of the SCR 22 and will, upon commutation, thereafter rise with the charging of the ignition capacitor 14 with the energy remaining in the second positive wave component, i.e., the same wave component that effected the firing of the SCR 22. The ready voltage illustrated in FIG. 7(B) will increase again with the increase in SCR anode potential.

While the firing of the SCR occurs at time $t_4$, ignition will not, however, result due to the lateness of the spark in the engine cycle. The operation of the engine in the reverse direction thus cannot be sustained.

It is thus apparent that it is necessary for the circuit of the present invention to receive a negative component of the trigger coil signal prior to the firing of the SCR. In the forward direction, this is achieved by the occurrence of the first negative component prior to the first positive component of the waveform. Since only the second positive wave component follows a significant negative component in the reverse direction, firing cannot occur until the occurrence of the second positive wave component, i.e., about 70° after normal firing and too late in the engine cycle to sustain engine operation.

CALIBRATION FOR ENGINE SPEED

To accomplish calibration of the circuit of FIG. 1 for a specific desired engine speed, the relative values of the capacitor 38 and the trigger coil 30 must be adjusted to achieve the desired resonance. It has been found convenient to effect such calibration by adjustment of the value of the capacitor 38.

By using a monolithic capacitor for the capacitor 38, and by using a discriminator circuit to control the motor of a grinder feed mechanism, the value of the capacitor 38 may be adjusted while the circuit of FIG. 1 is connected to a test stand running at the selected maximum engine speed. In this manner, the value of the capacitor 38 may be adjusted by grinding until the circuit ceases to respond in the speed limiting mode.

ADVANTAGES AND SCOPE OF THE INVENTION

As will have been apparent from the foregoing, the novel capacitor discharge ignition circuit of the present invention permits the utilization of in-phase charging and trigger coil waveforms without the problems normally associated with shutoff of the electronic switch through which the ignition capacitor is discharged as well as problems associated with the reestablishment of conduction of the electronic switch. By use of the circuit of the present invention, the high energy content of the second wave component may be utilized both for charging the ignition capacitor and for triggering the electronic switch effecting the discharge thereof.

The capacitor ignition of the present invention also provides for an automatic advance in the time of occurrence of the spark responsive to an increase in engine speed while limiting the maximum speed of the engine by modification of the fourth wave component of the trigger coil waveform. Automatic adjustment is made for variations in ambient temperature and in the spacing of the legs of the laminated core upon which the charging and trigger coils are mounted. Thus automatic compensation for variations in temperature and lamination gap is effected.

The capacitor discharge ignition circuit of the present invention also requires an extremely low impedance manually actuable switch to effect shutoff of the engine while avoiding the unnecessary loading of the charging coil waveform. The likelihood of inadvertent engine shutoff by moisture laden and acidic debris such as sawdust is avoided without any significant reduction in the energy available for charging the ignition capacitor.

The capacitor discharge ignition circuit of the present invention also prevents operation of the engine in a reverse direction in which the charging and trigger coils are inverted.

While a preferred embodiment of the circuit of the present invention has been described in detail, the invention may be embodied in other specific forms without departing from the spirit or essential characteristics thereof. The presently disclosed embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. In a capacitor discharge ignition circuit including an ignition capacitor charged by the engine responsive rotation of a magnetic member through flux cutting proximity to a charging coil to thereby provide a charging coil waveform and discharged through an electronic switch and high voltage transformer by the engine responsive rotation of a magnetic member though flux cutting proximity to a trigger coil to thereby provide a trigger coil waveform substantially in-phase with the charging coil waveform, a method of advancing the time of discharge of the ignition capacitor relative to the engine cycle with an increase in the speed of the engine comprising the steps of providing a trigger coil waveform with a plurality of voltage peaks in a major wave component thereof and discharging the ignition capacitor responsively to the first of said voltage peaks with an amplitude exceeding a predetermined value.

2. In a capacitor discharge ignition circuit including an ignition capacitor charged by the engine responsive rotation of a magnetic member through flux cutting proximity to a charging coil to thereby provide a charging coil waveform and discharged through an electronic switch and high voltage transformer by the engine responsive rotation of a magnetic member through flux cutting proximity to a trigger coil to thereby provide a trigger coil waveform substantially in-phase with the charging coil waveform, an improvement comprising means for producing oscillations in a component of the trigger coil waveform responsive to engine speed and for discharging the ignition capacitor responsively to the first of said oscillations having an amplitude exceeding a predetermined value, to thereby advance the time of discharge of the ignition capacitor relative to the engine cycle with an increase in the speed of the engine.

3. In a capacitor discharge ignition circuit including an ignition capacitor charged by the engine responsive rotation of a magnetic member through flux cutting proximity to a charging coil to thereby provide a charging coil waveform and discharged through a high voltage transformer and an electronic switch having a control electrode by the engine responsive rotation of a magnetic member through flux cutting proximity to a trigger coil electrically connected to the charging coil, to thereby provide a trigger coil waveform substantially inphase with the charging coil waveform, the improvement comprising circuit means interconnected between the control electronic switch and the interconnection of the charging and trigger coils, said means including:

a two leg parallel circuit between said control electrode of the electronic switch and the interconnection of said coils, one of said legs including a resistor and the other of said legs including a first diode;

a circuit between the control electrode of the electronic switch and the end of said trigger coil opposite to the interconnection of said coils, said circuit including a first capacitor in series with the parallel combination of a second diode and a series connected second capacitor and Zener diode;

a third diode connected between the interconnection of said coils and a point intermediate said first and second capacitors;

a resistor connected across said second capacitor;

a fourth diode connected across said first and second capacitors; and a third capacitor connected across said trigger coil.

4. The capacitor discharge ignition circuit of claim 3 wherein said first diode is poled to conduct toward the interconnection of said coils;

wherein said second diode is poled to conduct toward said control electrode;

wherein said third diode is poled to conduct said control electrode;

wherein said fourth diode is poled to conduct toward a point intermediate said second capacitor and said Zener diode; and, wherein said Zener diode is poled to conduct said control electrode.

* * * * *